United States Patent Office 2,821,513
Patented Jan. 28, 1958

---

2,821,513

FOAMABLE RESINOUS COMPOSITION CONTAINING TERTIARY ALKYL AMMONIUM NITRITE AND PROCESS OF FOAMING SAME

James S. Strong, Oreland, Pa.

No Drawing. Application June 9, 1954
Serial No. 435,620

13 Claims. (Cl. 260—2.5)

This invention deals with compositions suitable for forming expanded, flexible, porous plastics and with a method for preparing such expanded plastics from plastisols.

The process of this invention comprises mixing a tert-alkyl ammonium nitrite with a plastisol and heating the mixture to temperatures at which decomposition of the said nitrite occurs and the plastisol is fluxed. This invention also contemplates the novel compositions which result by incorporating a said nitrite into a plastisol, these compositions being termed foamosols.

While the field of foamed plastics extends back but a relatively short time, considerable work has been directed toward production of satisfactory foamed, flexible plastics without as yet attaining a completely satisfactory product. Since this field promises to be an extremely important phase of plastic technology, the considerable effort expended has been warranted. Any advance which provides an improved product has been welcomed.

Materials used in producing rubber sponges or foams have not proved desirable in flexible vinyl plastics and have been discarded because of such deficiencies as insufficient gas volume being developed per unit weight, often poor dimensional stability of the foamed object on ageing, rapid uncontrolled exothermal decomposition of the blowing agent, development of colored and/or malodorous products, or excessive decomposition temperatures.

During recent years azoisobutyronitrile was developed as a blowing agent and was found to produce good foamed products under many heating conditions. Its favorable properties, however, are completely overcome by the objectionable, highly toxic decomposition product.

More recently some hydrazides have been proposed, but their cost is excessive and their decomposition is too exothermic to permit the use of a proportion giving a minimum density to foamed plastics.

In another approach to the problem of preparing foamed rubber and plastics it has been proposed that certain lower alkyl ammonium nitrites, such as monoethyl, di-n-butyl, tri-n-butyl, diisopropyl, and diisobutyl ammonium nitrites be used. The nitrites from tertiary or secondary amines lack requisite properties for good blowing of vinyl plastisols. While ethyl ammonium nitrite can be thermally decomposed at temperatures suitable for foaming plastisols, it possesses inherent disadvantages. It decomposes rapidly and with evolution of so much heat at the already elevated temperature of blowing that discoloration occurs. In a closed mold the excessive heat causes a "cheese-cake formation" at the center of the molded object. Furthermore, highly objectionable and repugnant odors result.

It was, therefore, an unexpected discovery that tert-alkyl ammonium nitrites are peculiarly effective for foaming plastisols, particularly in forming foamed objects in closed molds. These compounds may also be called trialkyl carbinyl ammonium nitrites, having the general formula

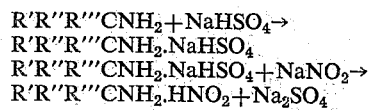

where R′, R″, and R‴ are small alkyl groups. In the preferred aspects of this invention the total number of carbon atoms in R′, R″, and R‴ does not exceed eight.

These compounds can be readily prepared by a number of methods. They are surprisingly stable at all ordinary temperatures and during their incorporation into plastisols to give foamosols. They can be prepared and isolated in good yields without interfering side-reaction as crystalline solids which show for this class of compound unusual stability to prolonged storage. They decompose at temperatures which are proper and convenient for the foaming of plastisols and the fluxing of these. They decompose not only to liberate a relatively large volume of nitrogen, but also tertiary alcohols which in large part break down to water and olefines which serve to increase additionally the volume of gas and which present no toxicity problem. Furthermore, they decompose smoothly and gradually without an outpouring of heat. Hence, they do not cause bad color, cheese-cake, or bad odors. They can yield foams with densities as low as two pounds per cubic foot, which is below that produced by previously known blowing agents.

The tert-alkyl ammonium nitrites include tert-butyl ammonium nitrite, tert-amyl ammonium nitrite, tert-octyl ammonium nitrite, and tert-nonyl ammonium nitrite, as examples of these compounds which are conveniently prepared from readily available starting materials. The nitrites are formed from the corresponding tert-alkyl or trialkyl carbinyl amines, various of which are now commercially available. The tert-alkylamine may be treated with nitrous fumes, which may be passed into an aqueous solution of the tert-alkylamine. In another method, an acid salt of the amine is treated with sodium nitrite in an organic solvent such as methanol or isopropanol.

A novel method is to treat a tert-alkylamine with sodium bisulfate in isopropyl alcohol and then add sodium nitrite. After the reaction has been completed, the reaction mixture is filtered to remove sodium sulfate and the solvent is stripped off to yield the desired tert-alkyl ammonium nitrite. The reaction may be represented.

R′R″R‴CNH$_2$+NaHSO$_4$→
R′R″R‴CNH$_2$.NaHSO$_4$
R′R″R‴CNH$_2$.NaHSO$_4$+NaNO$_2$→
R′R″R‴CNH$_2$.HNO$_2$+Na$_2$SO$_4$

The sodium sulfate serves to dry the reaction mixture and to permit obtaining the desired product as a dry crystalline solid.

Typical preparations of tert-alkyl ammonium nitrites follow, parts shown being by weight.

PREPARATION A

Anhydrous hydrogen chloride was passed into a solution of 73 parts of tert-butylamine in 240 parts of methanol until 38.5 parts of hydrogen chloride had been added. During the addition the temperature of the mixture was kept below 10° C. by external cooling. To the mixture sodium nitrite was added in an amount of 69 parts. The resulting mixture was stirred for twelve hours at about 25° C. The sodium chloride which formed was filtered off and the filtrate was subjected to distillation under reduced pressure to remove methanol and to leave the product as a mush. This was spread on porous porcelain and air-dried for 48 hours with occasional turning of the product to hasten drying. There was a yield of 76 parts of a pale yellow crystalline solid, which was chiefly tert-butyl ammonium nitrite contaminated with some salt. This product decomposed when heated to 126° C.

PREPARATION B

To a suspension of 138 parts of sodium bisulfate monohydrate in 237 parts of isopropyl alcohol there was added 73 parts of tert-butylamine. Since there was a mildly exothermic reaction, cooling was applied to prevent loss of amine and to control the reaction. When salt formation was complete, addition was made of 79 parts of isopropanol to give a more fluid medium. Thereto sodium nitrite was added to a total of 69 parts. The mixture was stirred for 12 hours and then filtered. The filtrate was evaporated under reduced pressure at 40° C. There resulted 103 parts of a pale yellow crystalline solid. It decomposed when heated to 126° C. and yielded 190 ml. of nitrogen per gram at normal temperature and pressure. The theoretical volume of nitrogen is 187 ml./g. A pure sample yielded 146% of this theoretical nitrogen gas volume, the difference being caused by evolution of isobutylene.

Repetition of the above procedure with a slight rinsing of the crystalline solid with a little isopropanol gave a white product decomposing at 130° C. This procedure applied to tert-amylamine, tert-octylamine, tert-nonylamine, or other tert-alkylamine yields the corresponding ammonium nitrite in good yield and purity. Typical of the trialkylcarbinyl compounds of relatively large size is the following preparation.

PREPARATION C

A suspension was made of 138 parts of sodium bisulfate monohydrate in 394 parts of isopropanol and thereto was added 129 parts of tert-octylamine

$(CH_3)_3CCH_2C(CH_3)_2NH_2$ followed by sodium nitrite in an amount of 69 parts. This mixture was stirred at 25°–30° C. for 12 hours. It was filtered. The solid was slurried with 400 parts of methanol, filtered off, again slurried with methanol (about 200 parts), and again filtered off. The combined filtrates were evaporated under reduced pressure to yield 69.5 parts of tert-octyl ammonium nitrite. This compound decomposed when heated to 108° C.

PREPARATION D

Nitrous fumes, generated by addition of 177 parts of concentrated nitric acid to solid sodium nitrite, were passed into a solution of 65 parts of tert-octylamine in 18 parts of water and 197 parts of isopropanol over a period of three hours. The resulting solution was stripped under under reduced pressure to yield a mush which was dried in air to yield 56 parts of a yellow solid which was principally tert-octyl ammonium nitrite. This product decomposed when heated at 112°–114° C. It liberated 120 ml. of nitrogen per gram (theory 127).

One or more of the tert-alkyl ammonium nitrites is mixed with a plastisol. The amount of such nitrite added can vary from about 1% to about 35% of the weight of the plastisol. There is no sharp lower limit, since as small an amount may be used as will give a desired degree of foaming. The upper limit is fairly well determined by the gas which can be held by the plastic composition under the particular conditions of blowing and by the particular ammonium nitrite selected. It is generally preferred that in pressure blowing the nitrite be from 10% to 25% of the weight of the plastisol. For free blowing the preferred range is from about 1% to about 2%.

It is desirable to disperse the nitrite as uniformly as possible through the plastisol. This may be done by preparing the nitrite in a finely divided state, a particle size of not over 100 mesh giving highly uniform foams, and stirring or mixing the fine particles thoroughly with the plastisol. It is sometimes desirable to mill the nitrite in the plastisol or to grind it therewith. In these ways a foamosol is prepared, which composition yields uniformly foamed plastic objects when heated to temperatures between 110° C. and 200° C.

The nitrites are most effective when used for forming shaped objects by heating a foamosol in a confined spaced under pressure at temperatures from about 140° to 200° C., cooling the thus heated material, best under pressure, and heating it under free conditions at 100° to 125° C. The product thus obtained is an expanded, cellular, flexible plastic in which the cells are separate spaces uniformly distributed throughout.

The foamosol may also be heated under free conditions with decomposition of the nitrite therein and fluxing of the plastisol. Under these conditions the product contains coarse openings which are usually interconnected as in a sponge. Temperatures of heating are between 100° and 200° C., the temperature being raised progressively to cause decomposition of the blowing agent and then to ensure fluxing of the dispersion of resin in plasticizer.

The term plastisol has been given to a dispersion of a polyvinyl chloride resin in a plasticizer which has relatively little solvent action of the resin at room temperatures. Plastisols are essentially liquid at moderate temperatures but are converted to tough, rubbery plastics when heated at temperatures which cause fluxing of the dispersion. For some applications a plastisol may be diluted with a volatile organic diluent. The composition is then called an organosol. Use of such a system is within the contemplation of this invention.

The resins used for preparing plastisols are primarily polyvinyl chloride and copolymers from vinyl chloride in chief amount modified by the presence of some other polymerizable ethylenic compound, such as vinyl acetate, vinyl propionate, vinyl butyrate, vinylidene chloride, methyl maleate, ethyl maleate, methyl fumarate, or ethyl fumarate. The polymer must be in the form of fine particles, as from emulsion polymerization, to be blended with the plasticizer.

When the polymer is in the form of fine, unagglomerated particles, it may be mixed with plasticizer merely by stirring. With agglomerated particles grinding or milling may be necessary. It is desirable in any case that the resin particles have high density and present a minimum surface for a given particle weight, indicating the desirability of a spherical shape. Particle sizes of 0.02 to two microns in diameter are commercially available in dispersion grades of resin.

Plasticizers for dispersing one or more of the vinyl chloride polymers may be of the monomeric or polymeric types. Frequently mixtures of both types are desirable. With free flowing it is advantageous to use primarily polymeric plasticizers. In the case where heating is conducted in a closed mold both types of plasticizer can be used with, perhaps, some preference for monomeric materials. In any situation an optimum plasticizer system can be worked out with due consideration of a given resin, the particular blowing agent and the absence or presence of pigments, fillers, or other added materials.

Typical monomeric plasticizers include di-2-ethylhexyl phthalate, dicapryl phthalate, diisooctyl phthalate, diisononyl phthalate, dibutyl adiphate, dibutyl sebacate, dioctyl azelate, dioctyl sebacate, triphenyl phosphates, and alkyl diphenyl phosphates. Typical polymeric plasticizers include soluble condensates from dicarboxylic acids, such as adipic, azelaic, or sebacic, and one or more glycols, such as ethylene, propylene, diethylene, and the like.

A plasticizer or a mixture of plasticizers is chosen to give good wetting and dispersing of resin particles without solution thereof at low to moderate temperatures and at the same time to provide a favorable porous structure in the fluxed product. At elevated temperatures the mixture of resin and plasticizer fuses or fluxes with the resin becoming solvated. The ratio of resin to plasticizer here ordinarily varies from 2:1 to 2:3.

The mixture of resin and plasticizer may be modified with added materials. For example, volatile dispersants such as ketones and hydrocarbons may be added. Also pigments, fillers, viscosity reducing agents, and stabilizers may be added. Usually such materials are dispersed in a portion of plasticizer and this mixture is combined with the dispersion of resin in plasticizer.

Typical preparations of foamosols and foamed shaped products therefrom are described in the following illustrative examples, wherein parts are by weight.

Example 1

There were thoroughly mixed 50 parts of a stir-in grade of a polyvinyl chloride and 50 parts of dioctyl phthalate. A basic lead silicate (3 parts) was added as a stabilizer. Thereto was added tert-octyl ammonium nitrite in an amount of 15 parts. The mixture was milled to ensure homogeneity. A mold was filled with the mixture and placed in a press where it was heated to 328° F. under pressure for 10 minutes. The mold was cooled before pressure was released. The thus formed object was heated for 20 minutes in an oven at 225° F. The molded object became expanded. It had a density of 4.7 lbs. per cu. ft. The surface was smooth and glossy. There was no evidence of excessive temperature resulting during decomposition of the nitrite. The blown object was very uniform with fine closed cells throughout. There was a slight olefinic odor which disappeared within two days at room temperature. The expanded object was quite stable to dimensional changes at room temperature.

Example 2

There were mixed 100 parts of a dispersion grade of a copolymer of vinyl chloride and vinyl acetate, 100 parts of dioctyl phthalate, six parts of basic lead silicate, and 20.6 parts of tert-octyl ammonium nitrite. The mixture was passed several times through a roller mill and charged to a mold. The mold was placed in a press and heated under pressure to 325° F. for 10 minutes and then cooled. The molded object was removed from the mold and heated in an oven at 225° F. for 20 minutes. The resulting expanded, foamed plastic object had a density of 3.2 lbs. per cu. ft. Its color was white. It was uniformly expanded with fine closed cells. In an accelerated ageing test wherein the foamed object was held at 85° C., it was found that density increased about 70% after 24 hours at this temperature. A comparable test with a current blowing agent gave a change of 117%. The latter agent caused an exothermic reaction with development of a yellow color.

Example 3

There were mixed 50 parts of a dispersion grade of polyvinyl chloride, 50 parts of dioctyl phthalate, 10 parts of filler (a fine clay), 3 parts of basic lead silicate, and 22.6 parts of tert-octyl ammonium nitrite. Portions of the mixture were passed three times through a roller mill and molded under pressure at 330° F. for 5, 10, and 20 minutes respectively. In each case the mold was cooled under pressure. The molded objects were heated free in an oven at 225° F. for 20 minutes. The resulting foamed plastic objects had densities of 4.4, 3.4, and 3.6 lbs. per cu. ft. All were white and uniform in cellular structure.

Another portion was heated in a mold at 310° F. for 10 minutes, cooled, and expanded as above. The resulting object had a density of 4.4 lbs. per cu. ft.

Another portion was heated in a mold at 355° F. for 5 minutes and expanded as above. The resulting object had a density of 3.4 lbs. per cu. ft. A commercially available agent under the same conditions gave an expanded object with a density of 4.5 lbs. per cu. ft. but gained 170% in density when subjected to the accelerated ageing test at 85° C. In contrast the objects expanded as above with tert-octyl ammonium nitrite gained 26% in density.

Substitution of ten parts of barytes for the above clay gave a foamosol which yielded objects molded at 325° F. and blown at 225° F. having a density of 3.8 lbs. per cu. ft. There was no evidence of an exothermic reaction and no development of color or of a more dense interior portion. The blown object was white, smooth, and uniform with fine closed cells.

Example 4

A mixture prepared as in Example 3 was molded at 320° F. under pressure and the resulting molded object was free blown at 225° F. for 20 minutes. The expanded object had a density of 3.9 lbs. per cu. ft. In an accelerated ageing test the expanded object gained 18% in density.

A mixture of the same type except that the tert-octyl ammonium nitrite was replaced with an equal weight of a commercially available agent gave an expanded object under the same conditions having a density of 4.4 lbs. per cu. ft. The gain in density was 195% during the accelerated ageing test.

Another portion of this mixture was molded as above at 320° F. and free blown for 10 minutes at 250° F. The resulting foamed plastic had a density of 3.5 lbs. per cu. ft. In an accelerated ageing test at 85° C. the density increased 11%.

In a comparison test with the commercial agent used above the initial density was 3.7 lbs. per cu. ft. and the gain in density on accelerated ageing was 154%.

Example 5

There were mixed 50 parts of a dispersion grade of a vinyl chloride-acetate copolymer, 50 parts of dioctyl phthalate, 6 parts of a basic lead silicate stabilizer and 25 parts of tertoctyl ammonium nitrite. This mixture was heated in a closed mold under pressure at 325° F. and the molded object was expanded at 225° F. for 20 minutes. The resulting expanded object was white and had a uniformly celled texture. It had a density of 2.9 lbs. per cu. ft.

A comparison test with the same per cent of a commercially available agent gave a foam having a density of 5.0 lbs. per cut. ft.

Repetition of the above procedures with 30 parts of tert-octyl ammonium nitrite gave foamed objects with a density of 2.4 lbs. per cut. ft. This concentration of commercially available agent failed to give a useful foamed product.

Repetition of the above procedure with substitution of 50 parts of a polymeric propylene sebacate (mol. wt. 7000) for the dioctyl phthalate gave expanded objects with densities of 2.9 with 25 parts of tert-octyl ammonium nitrite and 2.2 with 30 parts of this nitrite.

Example 6

A mixture of 40 parts of a dispersion stir-in grade of a polyvinyl chloride, 40 parts of dioctyl phthalate, and 4.8 parts of lead silicate was stirred. To 10.6 parts of this mixture was added 1.75 parts of tert-butyl ammonium nitrite in finely divided form (passing a 100 mesh screen). The mixture was stirred to give a useful foamosol.

A small mold was filled therewith, closed, heated in a press at 338° F. for 10 minutes under pressure, and cooled. The molded object thus formed was taken from the mold and heated free in an oven 225° F. for 20 minutes. The resulting foamed plastic had a density of 3.0 lbs. per cu. ft.

Another 10.6 part portion of the plastisol was stirred with 1.75 parts of the finely divided tert-butyl ammonium nitrite. This mixture was molded as above at 328° F. for 10 minutes and heated free at 250° F. for 10 minutes. The resulting object had a density of 1.89 lbs. per cu. ft.

The foamed objects were free from objectionable odor having at most what may be described as a slight musty odor, which diminished rapidly after post blowing.

In place of the above tert-octyl or tert-butyl ammonium nitrites there may be used any of the other trialkylcarbinyl ammonium nitrites containing a total up to nine carbon atoms with essentially the same results as shown above.

*Example 7*

A mixture of 100 parts of a dispersion stir-in grade of a polyvinyl chloride, 130 parts of a polymeric propylene sebacate (mol wt. 7000), 6 parts of lead silicate and 3 parts of tert-butyl ammonium nitrite was ground on a roller mill. Forty grams of this foamosol were placed in a cylindrical container whose base had a surface area of 55 sq. cm. This was then heated in an oven for 20 minutes at 225° F. to decompose the blowing agent and finally fluxed for 20–30 minutes at 325° F. The resulting foam had fine, even, largely interconnected cells with a density of 13 lbs. per cu. ft. in a sponge-like structure.

Foamosols prepared with tert-alkyl ammonium nitrites have a reasonable life which permits their preparation, short-timed storage, and shipping without marked loss of effectiveness. These foamosols give expanded plastics when heated above the decomposition temperatures of the said nitrites. The rate of decomposition is gradual, thus avoiding sudden increases in temperature. Hence, color remains excellent and texture uniform. Remarkably low, stable densities can be attained. Good color is obtained.

The expanded plastic objects prepared by the process of this invention may be in the form of blocks, sheets, or other shaped products for use as pads, mats, cushions, toys, stuffing, etc.

I claim:

1. A composition comprising a mixture of a fluid dispersion of polymerized vinyl chloride in a plasticizer therefor and a tert-alkyl ammonium nitrite of the formula $C(R')(R'')(R''')NH_2 \cdot HNO_2$ in which $R'$, $R''$, and $R'''$ are alkyl groups and altogether have a total of three to eight carbon atoms.

2. A composition adapted to yield a foamed plastic object when heated, comprising a fluid dispersion of a polyvinyl chloride in a plasticizer therefor having admixed therewith 1% to 35% of a tert-alkyl ammonium nitrite, of the formula $C(R')(R'')(R''')NH_2 \cdot HNO_2$, in which $R'$, $R''$, and $R'''$ are alkyl groups and altogether have a total of three to eight carbon atoms.

3. A composition adapted to yield a foamed plastic object when heated, comprising a fluid dispersion of a polyvinyl chloride in a plasticizer therefor, the ratio of said polyvinyl chloride to said plasticizer being from 2:1 to 2:3, said dispersion containing from 1% to 35% of a tert-alkyl ammonium nitrite, of the formula $$C(R')(R'')(R''')NH_2 \cdot HNO_2$$

in which $R'$, $R''$, and $R'''$ are alkyl groups and altogether have a total of three to eight carbon atoms.

4. A composition, according to claim 3, in which the tert-alkyl group is tert-butyl.

5. A composition, according to claim 3, in which the tert-alkyl group is tert-octyl.

6. A composition adapted to yield foamed plastic objects when heated comprising a mixture of a plastisol comprising a fluid dispersion, in a plasticizer therefor, of a polymer selected from the group consisting of polyvinyl chloride and copolymers of vinyl chloride and vinyl acetate and a tert-alkyl ammonium nitrite of the formula $C(R')(R'')(R''')NH_2 \cdot HNO_2$, in which $R'$, $R''$, and $R'''$ are alkyl groups and altogether have a total of three to eight carbon atoms.

7. A process for preparing expanded plastic objects which comprises mixing a tert-alkyl ammonium nitrite of the formula $C(R')(R'')(R''')NH_2 \cdot HNO_2$, in which $R'$, $R''$, and $R'''$ are alkyl groups and altogether have a total of three to eight carbon atoms, with a plastisol comprising a fluid dispersion of a polymerized vinyl chloride resin in a plasticizer therefor, and heating the resulting mixture to temperatures at which the nitrite is decomposed and the plastisol is fluxed.

8. A process for preparing expanded plastic objects which comprises preparing a mixture of a tert-alkyl ammonium nitrite of the formula $$C(R')(R'')(R''')NH_2 \cdot HNO_2$$

in which $R'$, $R''$, and $R'''$ are alkyl groups and altogether have a total of three to eight carbon atoms, and a plastisol comprising a dispersion of a polyvinyl chloride resin in a plasticizer therefor and heating the resulting mixture to temperatures at which the nitrite is decomposed and the plastisol is fluxed.

9. A process for preparing expanded plastic objects which comprises mixing a plastisol, comprising a polymerized vinyl chloride resin dispersed in a plasticizer therefor in a resin to plasticizer weight ratio of 2:1 to 2:3, with 1% to 35%, on the weight of the plastisol, of a tert-alkyl ammonium nitrite of the formula $$C(R')(R'')(R''')NH_2 \cdot HNO_2$$

in which $R'$, $R''$, and $R'''$ are alkyl groups and altogether have a total of three to eight carbon atoms, and heating the resulting mixture at temperatures between 110° C. and 200° C. with decomposition of the nitrite and fluxing of the plastisol.

10. The process of claim 9 in which the tert-alkyl ammonium nitrite is tert-butyl ammonium nitrite.

11. The process of claim 9 in which the tert-alkyl ammonium nitrite is tert-octyl ammonium nitrite.

12. A process for preparing expanded plastic objects which comprises mixing a plastisol comprising a polymerized vinyl chloride resin dispersed in a plasticizer therefor in a resin to plasticizer weight ratio of 2:1 to 2:3 with 10% to 25%, on the weight of the plastisol, of a tert-alkyl ammonium nitrite of the formula $$C(R')(R'')(R''')NH_2 \cdot HNO_2$$

in which $R'$, $R''$, and $R'''$ are alkyl groups and altogether have a total of three to eight carbon atoms, heating the resulting mixture under pressure in a confined space at 140° to 200° C., cooling the thus heated material, and heating it under free conditions at 100° to 125° C.

13. A process for preparing expanded plastic objects which comprises mixing a plastisol comprising a polymerized vinyl chloride resin dispersed in a plasticizer therefor in a resin to plasticizer weight ratio of 2:1 to 2:3 with 1% to 2%, on the weight of the plastisol, of a tert-alkyl ammonium nitrite of the formula $$C(R')(R'')(R''')NH_2 \cdot HNO_2$$

in which $R'$, $R''$, and $R'''$ are alkyl groups and altogether have a total of three to eight carbon atoms, and heating the resulting mixture between 100° and 200° C., the temperature being raised progressively to permit decomposition of the ammonium nitrite and to flux the plastisol.

References Cited in the file of this patent

UNITED STATES PATENTS

| | | |
|---|---|---|
| 2,419,327 | Wachter et al. | Apr. 22, 1947 |
| 2,626,968 | Newell | Jan. 27, 1953 |